Oct. 23, 1934.  H. B. BARRETT  1,977,791
BRAKE DRUM TRUING MACHINE
Filed June 1, 1931
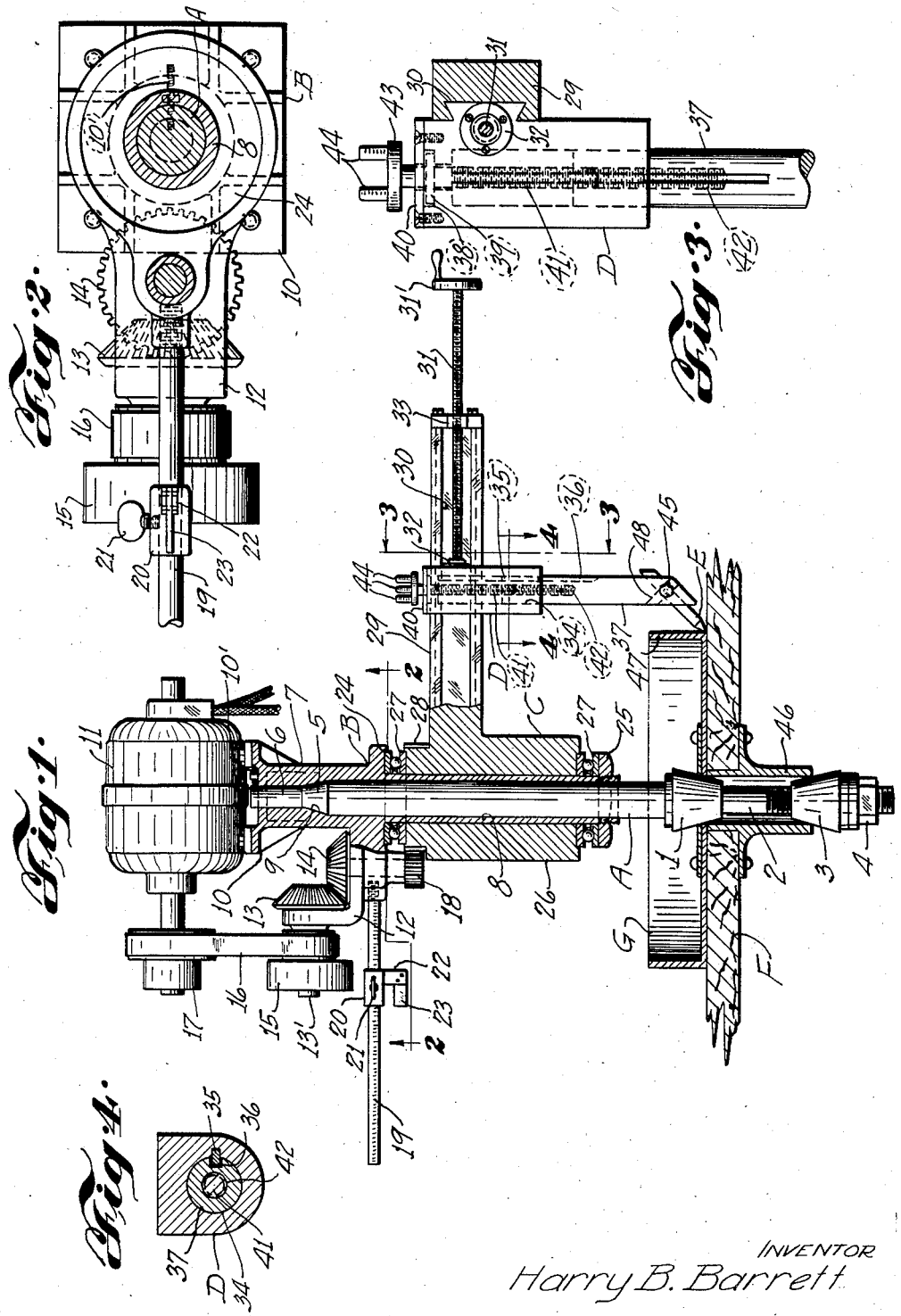
INVENTOR
Harry B. Barrett
By
ATTORNEY Patented Oct. 23, 1934

1,977,791

UNITED STATES PATENT OFFICE 1,977,791

BRAKE DRUM TRUING MACHINE

Harry B. Barrett, Los Angeles, Calif., assignor to H. B. Barrett, Ltd., Las Vegas, Nev., a corporation of Nevada Application June 1, 1931, Serial No. 541,342

2 Claims. (Cl. 82—4)

This invention relates generally to portable machine tools and has more particular reference to a machine for truing the brake-drums of automobile wheels and the like.

My invention has for its chief object the provision of a machine of the character set forth arranged to be supported on a brake-drum carrying wheel for automatically, subsequent to proper setting of the machine to the work, performing the operation of turning or facing the brake-drum concentrically with the axis of the wheel.

My invention has for other objects the provision of a brake-drum truing machine whose cutting or facing tool is automatically and with accuracy and precision fed across the work, which has parts readily assembled and disassembled for ease in mounting and dismounting the tool on the work, and which is simple, compact, and durable in structure, and highly efficient in the performance of its intended functions.

And with the above and other objects in view, my invention resides in the novel features of form, construction, arrangement, and combination of parts hereinafter described and pointed out in the claims.

In the accompanying drawing,—

Figure 1 is a side elevational view, partly in section, of a brake-drum truing machine embodying my invention, illustrated as in operative mounted position on a brake-drum carrying wheel, parts of the latter being shown in section and other parts broken away;

Figure 2 is a sectional view through the arbor and associated parts of the machine, taken approximately along the line 2—2, Figure 1;

Figure 3 is an enlarged end elevational view, partly in section, of the tool-holder carriage and associate parts, taken approximately along the line 3—3, Figure 1, the tool-bar being partly broken away; and Figure 4 is an enlarged detail sectional view through the body of the carriage, taken approximately along the line 4—4, Figure 1.

Referring now more in detail and by reference characters to the drawing, which illustrates a preferred embodiment of my invention, A designates an arbor having at an end a cone-shaped enlargement 1 and a reduced shank 2 therebelow, on which is threaded a shiftable cone-shaped member 3 adapted for axially opposing wheel-engaging co-operation with the cone 1, a jam-nut 4, being provided on the shank 2 for retaining the cone 3 in adjusted position on the arbor A. At its other normally upper end, the arbor A is provided with a cone-shaped shoulder 5 converging to a reduced part or terminal stem 6.

B designates a frame or casting which includes a head-portion 7 and a depending sleeve 8, both suitably bored to receive the arbor A, the bore of the head-portion 7 being reduced or necked, as at 9, complementary to the shoulder 5 for co-operatively therewith detachably supporting the frame B on the arbor A. At its upper end, the head 7 terminates in or is provided with a bracket 10 for supporting a motor or other prime mover 11.

Threaded at one end into a portion of the bracket 10, is an elongated screw 10' adapted for manipulation relatively to the bracket 10 for engaging an upwardly projecting portion of the stem 6 for securing the frame B to, and against rotation on, the arbor A.

From the frame B laterally projects a suitable angle bracket 12 for rotarily supporting a pair of meshing bevel-gears 13, 14, the gear 13 having its shaft 13' horizontally extended for carrying a stepped pulley 15 adapted, by means of a belt 16, for co-operation with a complementary stepped pulley 17 mounted on the shaft of the motor 11. The shaft of the other gear 14 depends through an arm of the bracket 12 for supporting a pinion 18.

Projecting laterally from, and preferably having detachable threaded engagement at its inner end with a part of the bracket 12 of, the frame B, is a normally horizontal bar 19, on which, for purposes presently appearing, is adjustably longitudinally shiftable a slide 20, which preferably is suitably equipped with a thumb-screw 21 for impingingly engaging the bar 19 for securing the slide 20 in adjusted positions on the bar 19. Depending from the slide 20, also for purposes presently appearing, is a tongue 22, from which radially outwardly projects a flexible member or spring finger 23.

At the junction of the sleeve 8 with the head 7, the casting or frame B is provided with a shoulder 24, and to the depending end of the sleeve 8 is threaded a nut or like shiftable member 25 for co-operatively, in opposition to the shoulder 24, retaining therebetween for rotation on the sleeve 8 the hub 26 of a tool-holder C axially interposed preferably between suitable ball-thrust bearings 27 respectively abutting the shoulder 24 and nut 25; and fixed on the hub 26, is a gear 28 having continuous meshing engagement with the pinion 18 for rotary actuation of the tool-holder C on the frame B with the arbor A as an axis.

Laterally projecting from the hub 26, is a normally horizontal arm 29 having a preferably dovetailed longitudinal way 30, in which is slidable the complementary tongue of a carriage D, which latter is manually shiftable in the way 30 by means of an elongated traversing screw 31 having one end operatively connected by a flange 32 to the carriage D and threaded continuously for working through a terminal nut 33 at the outer end of the arm 29, the screw 31 for convenient manipulation thereof having a suitable crank or handle 31'.

Provided in the body portion of the carriage D is a vertical bore or way 34 axially parallel to and centered radially with respect to the arbor A; and in the wall of the bore 34, is fitted a key 35 cooperating with a featherway or groove 36 provided longitudinally in the upper end of a tool-bar 37 vertically guided in the bore 34 for projecting shiftably below the carriage D.

Formed in the upper face of the carriage D, is a recess 38, and having a collar 39 rotarily seated, and by means of a plate 40 attached to the carriage D secured, in the recess 38, is an elongated longitudinally disposed feed screw 41 adapted for engaging its threaded depending end with a co-operatively threaded bore 42 provided in the tool-bar 37. At its upper end, the screw 41 projects through the plate 40 and is fitted with a disc 43 carrying a series of preferably three annularly spaced upstanding pins or studs 44 disposed in the horizontal plan of the finger 23 for co-action successively therewith, on rotary actuation of the tool-holder C, for correspondingly intermittently actuating the screw 41 a third, more or less, of a revolution on each revolution of the tool-holder C for correspondingly shifting the tool-bar 37 preferably upwardly in the bore 34 of the carriage D.

At its depending end, the tool-bar 37 is suitably preferably obliquely apertured to receive a facing tool E or the like, a set-screw 45 serving to adjustably retain the tool E in the bar 37 for proper engagement with the work.

F designates a conventional brake-drum carrying wheel having a suitably bored hub 46, and G a brake-drum mounted on the wheel F having a peripheral flange 47, as is customary in the automotive art.

In the use of the machine, the wheel F is supported in any convenient manner with the brake-drum G presented upwardly. The arbor A is, by backing off the screw 10', preferably for convenience disassembled from the rest of the machine, thereby considerably lightening the labor of mounting the arbor A on the wheel F, which mounting is accomplished by removing the nut 4 and cone 3 from the shank 2 and inserting the latter downwardly into the bore of the hub 46 until the cone 1 is carefully centered therein. On drawing the cone 3 on the shank 2 and locking the same by means of the nut 4, the arbor A may hence be conveniently and expeditiously mounted in vertical alignment with the axis of the wheel F. The frame B and its carried parts may then be readily mounted on the arbor A and secured thereon by suitable manipulation of the screw 10'.

The tool E being properly mounted in the tool-bar 37, the carriage D may be adjustably shifted toward or from the work or drum-flange 47 by suitable manipulation of the traverse-screw 31. By suitable also manual manipulation of the feed-screw 41, the tool E may be readily set or brought to position for commencing the cut on the brake-drum G. The slide 20 is then shifted on the bar 19 and then fixed thereon in such laterally adjusted position by means of the thumb-screw 21, so as to properly yieldingly engage or co-act with the radially innermost one of the pins 44 successively, on revolution of the tool-holder C, presented in the way of the finger 23 for hence intermittently feeding the tool E across the work as the drum-truing operation proceeds.

Suitably controlled actuation of the motor 11, of course, rotarily operates the tool-holder at a speed according to the setting of the belt 16 on the step-pulleys 15, 17. Further continued operation of the machine, being obvious to one skilled in the art, is hence not deemed necessary of more complete description here, but I desire to particularly point out that the operation of taking a cut across the face of the drum-flange 47 is, as will be readily seen, effected automatically once the machine is set in motion.

The machine is simple, compact, and durable in structure, may, as I have described, be readily and conveniently operatively mounted in connection with the work, and fulfills in every respect the objects previously stated.

As indicated in Figure 1, the tool-bar 37 is preferably provided with an additional oblique-way 48 for reversing the working position of the tool E for selected engagement with the inner face of the drum-flange 47, and it will be understood that other changes and modifications in the form, construction, arrangement, and combination of the several parts of the machine may be made and substituted for those herein shown and described without departing from the nature and principle of my invention.

Having thus described my invention, what I claim and desire to secure by Letters Patent is,—

1. In a brake-drum truing machine, in combination, an arbor for mounting in axial alignment with the axis of a brake-drum, a frame stationarily mounted on the arbor, the frame including a head-portion and a depending sleeve, a shoulder on the frame intermediate the head-portion and sleeve, a support secured to the sleeve in spaced relation to the shoulder, a hub journalled for rotation on the sleeve intermediate the support and shoulder, an arm projecting radially outwardly from the hub, a carriage shiftable on the arm toward and from the sleeve, a tool-holder supported by and shiftable relatively to the carriage, means including a prime-mover fixed on the frame head-portion and a driving connection between the prime-mover and the hub for rotarily actuating the hub, carriage, and tool-holder relatively to the arbor, frame, and drum, a tool angularly presented from the tool-holder to the drum, and means for shifting the tool during rotary actuation of the carriage for cutting across the drum approximately parallel with the axis thereof.

2. In a brake-drum truing machine, in combination, an arbor for mounting in axial alignment with the axis of a brake-drum, a frame stationarily mounted on the arbor, the frame including a head-portion and a depending sleeve, a shoulder on the frame intermediate the head-portion and sleeve, a support secured on the sleeve in spaced relation to the shoulder, a hub journalled for rotation on the sleeve intermediate the support and shoulder, an arm projecting radially outwardly from the hub, a carriage shiftable on the arm toward and from the sleeve, a tool-holder supported by and shiftable relatively to the carriage, means for rotarily actuating the hub, carriage, and tool-holder relatively to the arbor, frame, and drum, said means including a prime-mover fixed on the frame over the outer end of the arbor, a bracket on the frame, meshing gears supported by the bracket having driving connection with the hub, and a belt-connection between the gears and the prime-mover, a tool angularly presented from the tool-holder to the drum, and means for shifting the tool during rotary movement of the carriage for cutting across the drum approximately parallel with the axis thereof.

HARRY B. BARRETT.